No. 644,500. Patented Feb. 27, 1900.
J. S. COPELAND.
DRIVING AND BRAKE MECHANISM.
(Application filed July 20, 1899.)
(No Model.) 2 Sheets—Sheet 2.
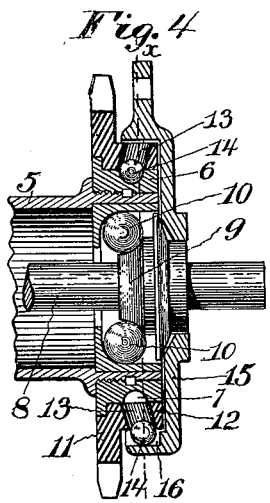
Fig. 4
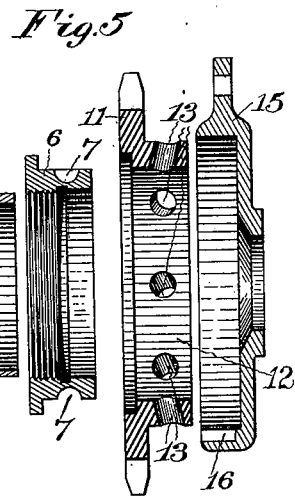
Fig. 5
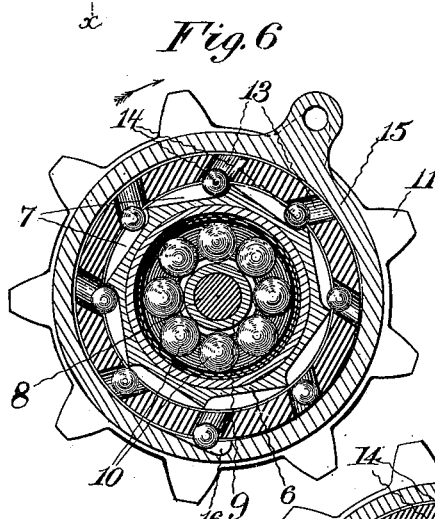
Fig. 6
Fig. 8.
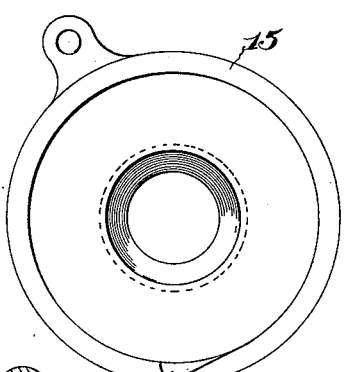
Fig. 7
Witnesses:
William H. Barker
Filton Barker
Inventor:
James S. Copeland,
by Chas. L. Burdett,
Attorney
THE NORRIS PETERS CO., PHOTO-LITHO., WASHINGTON, D. C.

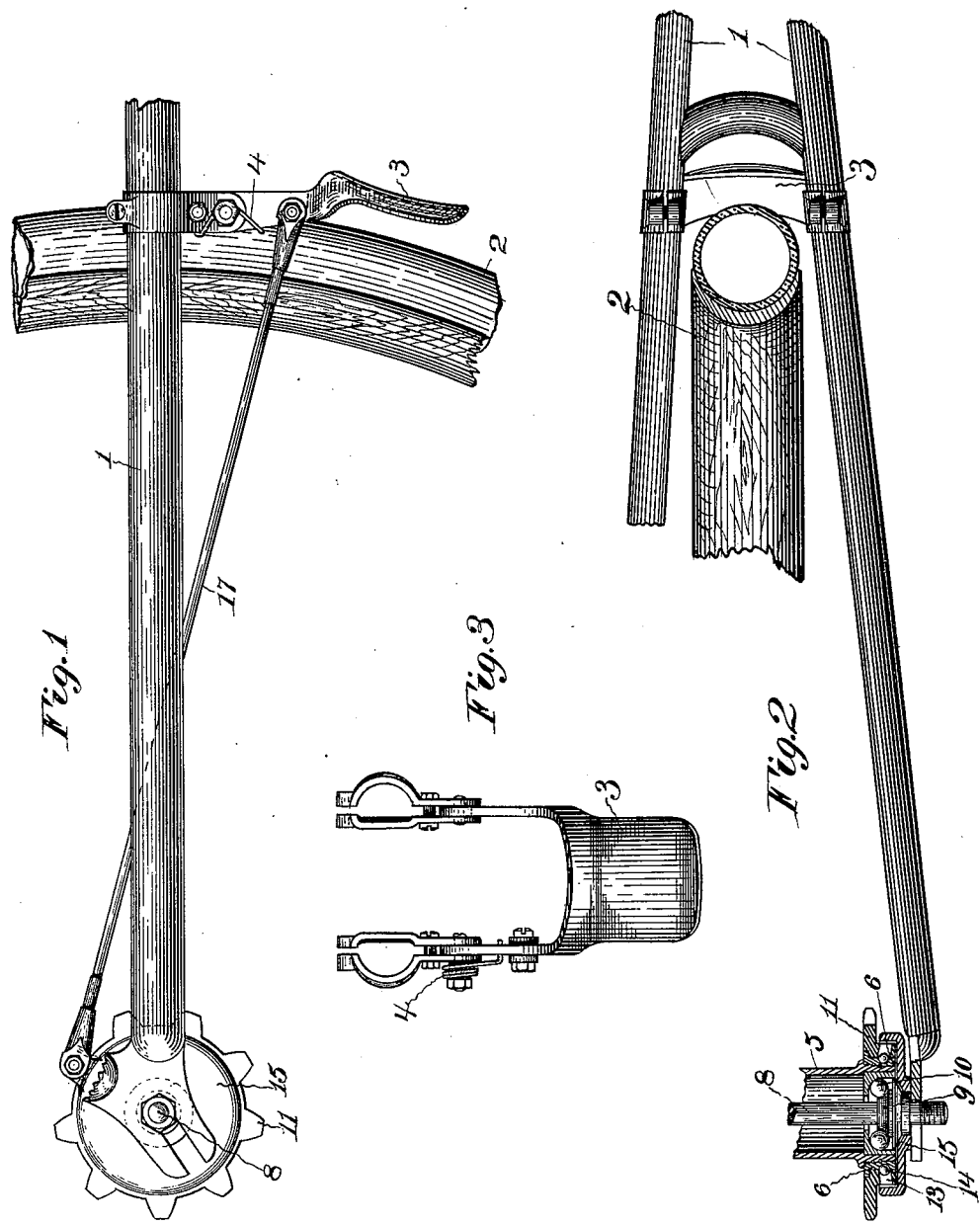

UNITED STATES PATENT OFFICE.

JAMES S. COPELAND, OF HARTFORD, CONNECTICUT.

DRIVING AND BRAKE MECHANISM.

SPECIFICATION forming part of Letters Patent No. 644,500, dated February 27, 1900.

Application filed July 20, 1899. Serial No. 724,480. (No model.)

*To all whom it may concern:*

Be it known that I, JAMES S. COPELAND, a citizen of the United States, and a resident of Hartford, in the county of Hartford and State of Connecticut, have invented certain new and useful Improvements in Driving and Brake Mechanism, of which the following is a full, clear, and exact description, whereby any one skilled in the art can make and use the same.

My invention relates to the class of devices employed for driving and for retarding or stopping a vehicle, as a bicycle or the like, by means of a controlling device common to each of said operations; and the object of my invention is to provide a device of this class that shall be extremely simple of construction, effective in operation, few as to number of parts, and one that shall respond readily to force applied to the controlling device.

To this end my invention consists in the device as a whole, in the combination of parts, and in the details and their combination, as hereinafter described, and more particularly pointed out in the claims.

Referring to the drawings, Figure 1 is a view in side elevation of the lower rear fork of a bicycle equipped with my improved device, a portion of the rim and tire of a wheel also being shown. Fig. 2 is a top or plan view of the same with parts broken away and showing part of the hub of the rear wheel in central section with the brake-rod removed. Fig. 3 is a front view of the brake-spoon. Fig. 4 is a detail view, on enlarged scale, in central lengthwise section, through a portion of the wheel-hub, showing the driving and brake-operating devices. Fig. 5 is a like view showing parts separated. Fig. 6 is a view, on enlarged scale, in cross-section, through the device on line $x$ $x$ of Fig. 4. Fig. 7 is a detail side view, on enlarged scale, of the case, looking into the same. Fig. 8 is a detail view showing a construction in which the number of ratchet-teeth and the number of pawl-sockets are unequal.

In the accompanying drawings the numeral 1 denotes each side member of the lower rear fork of a bicycle, 2 the rear wheel of a bicycle, and 3 what is commonly known as a "spoon-brake," supported in any suitable manner to operate against the tire of a wheel, the brake preferably being supported by the lower rear fork and having a spring 4, that holds it in its normal position away from the tire.

The hub 5 of the wheel supports a driven member, as the ratchet-wheel 6, secured to the wheel-hub in any suitable manner, as by means of interengaging screw-threads. The teeth of this ratchet-wheel are formed by making grooves 7 in the face of the wheel, and the grooves are shaped to receive a movable element or pawl, preferably round, as shown in the drawings. Each of these grooves 7 in the ratchet member is less in depth at the deepest part than the height of the pawl which fits therein and is so shaped as to its bottom as to present a wedging or stop surface or wall between which and the wall of the recess or socket in the carrier the pawl will bind in the clutching operation.

A driving member 11, herein shown as a sprocket-wheel of a chain-driven wheel, although it is to be understood that my invention is not limited to use with such driving means, is loosely mounted on the ratchet-wheel 6 and is adapted to be driven in any ordinary manner, such means, however, not being herein shown. A carrier 12 is secured to the sprocket-wheel or driving member, these two parts being preferably formed of a single piece, although not limited to such construction so long as they are so united as to rotate together. This carrier is provided with ratchet-openings 13, extending therethrough, and in these openings are located pawls 14.

A case 15 is loosely mounted on the axle 8 or on an enlargement thereof, as herein shown, and has a recess 16 of varying depth and with end wall adapted to receive the pawls 14. A brake-rod 17 is secured to the case 15 at some little distance from the center and to the spoon-brake 3, the ends of the rod preferably being secured to these parts.

In the preferred form of the invention the openings through the carrier are inclined, the outer ends being located in advance (considered with relation to the forward movement of the driving-wheel) of the inner ends, this feature of construction providing a bearing-surface comprising the wall of each of the openings that presses upon the pawl appurtenant thereto and forces it against the end wall of the adjacent groove 7, the walls of the openings thus extending lengthwise in a line at right angles, or approximately so, to a line through the bearing-points of the pawls, the action of the end walls of the grooves and the walls of the openings thus acting in direct opposition to each other and reducing the wear on the pawls to a minimum. When of spheroidal form, the pawls are borne loosely in the openings, so that they may rotate therein in all directions and bring the entire outer surface thereof into contact with the bearing-surfaces, thus equalizing the wear on the pawls and distributing it over the entire outer surface thereof.

In the operation of the device, the driving member 11 being driven in the direction indicated by the arrow in Fig. 6, the pawls 14 on the upper side of the ratchet-wheel engage the side walls of the openings in the carrier 12 and the end walls of the grooves 7 in the ratchet-wheel, rotating it and the driving-wheel 2 to propel the vehicle forward. When the vehicle is moving forward, the driving member 11 being held against rotation, the driving-wheel 2 continues to revolve, carrying with it the ratchet-wheel 6. In this operation the pawls in the upper side of the carrier retreat into the openings 13 in the carrier and immediately advance into the next succeeding groove in the ratchet-wheel, while the pawls located in the lower side of the carrier successively advance into the recess 16 in the case 15 and immediately retreat into the openings in the carrier. Upon the application of force to the driving member in a reverse direction, as by back-pedaling, to that applied in driving the vehicle forward the pawls located in the recess 16 or immediately forward thereof are forced against the shoulder of said recess, resting between the straight wall of the opening in the carrier and said shoulder. This operation rotates the case 15 backward, exerting a pull upon the rod 17 that throws the spoon-brake 3 forcibly into contact with the tire of the wheel 2, thus applying the brake.

It will be seen from the above construction that a single set of balls or pawls operates both to drive the vehicle and also to retard its forward movement, and I do not limit myself to the precise construction herein shown and described for accomplishing this result, as it is obvious that the arrangement and construction of various parts may be altered to embody such feature and yet come within the scope of my invention.

While the openings in the carrier, and notches in the ratchet-wheel, and the pawls have been shown herein of an equal number, it is to be understood that I do not limit myself to such an arrangement, as, in fact, an advantage exists in a construction of parts in which the number of ratchet teeth or recesses exceeds that of the pawls, there being a reduction of lost motion when power is applied to throw the clutch into operation. This form is shown in Fig. 8 of the drawings, and in such some one of the four pawls which are in position to engage the ratchet on the continuation of forward movement of the driving members will be located near the shoulder in the ratchet-recess, whereas in the other form, where the number of pawls and of ratchet-recesses is equal, it is possible that all might be so located as to require a movement of the carrier equal to the length of the recess before the pawl would act to drive the wheel.

In the within-described embodiment of my invention the ratchet-recesses have been shown with a somewhat abrupt end wall curved to fit the rounded shape of the ball which acts as a pawl; but such form of end wall is not essential, other forms in which the pawl is so located as to bind between the carrier and the other clutch member to cause simultaneous movement being contemplated by me as within the invention. The concentric disposition of the carrier and the other clutch members is a distinct feature of the invention, as it properly disposes the thrusting forces in radial lines during the chucking action, and such strains are well resisted by the circular parts without displacement. Modifications of such arrangements are, however, contemplated as within the invention.

I claim as my invention—

1. In a driving and brake mechanism for a vehicle, in combination, a driving member consisting of a gear-wheel, a pawl-carrier operated by the driving member and having pawl-sockets extending therethrough, a driven clutch member located on one side of the carrier and having a ratchet-recess, a driven clutch member located on the opposite side of the carrier and having a ratchet-recess, brake mechanism connected to the last-mentioned clutch member, and a self-operating pawl located in the socket in the carrier said pawl being adapted to engage the recesses in each of the driven clutch members.

2. In a driving and brake mechanism, in combination, a driving member, a pawl-carrier operated by the driving member and having pawl-sockets each extending therethrough, a plural number of independently-movable driven clutch members located concentric with and on opposite sides of the carrier and each having a ratchet-recess formed therein, and a gravity-operated pawl borne by the carrier and adapted to engage the recess in the respective oppositely-operating driven clutch members.

3. In combination, a driving member, a pawl-carrier operated by the driving member and having pawl-sockets extending therethrough and inclined in the direction of rotation of the carrier, a free-moving pawl borne in each of the pawl-sockets, a plural number of independently-movable driven clutch members located on opposite sides of the carrier and each having a shouldered ratchet-recess formed therein adapted to register with the pawl-sockets in the carrier, the shoulder of the ratchet-recess in one of the driven clutch members facing in a different direction of rotation from the shoulder in the ratchet-recess in the other driven clutch member, and each shoulder adapted to be engaged by each of said pawls.

4. In combination, a driving member, a pawl-carrier operated by the driving member and having pawl-sockets extending therethrough, a spherical pawl borne in each of said pawl-sockets, a plural number of independently-movable clutch members located on opposite sides of the carrier and each having a shouldered ratchet-recess formed therein adapted to register with the pawl-sockets in the carrier, a shoulder of the ratchet-recess in one driven clutch member facing in a different direction of rotation from the shoulder of the ratchet-recess in the other driven clutch member and the shoulder in each of the driven clutch members being adapted to be engaged by each of the pawls in the carrier.

5. In a driving and brake mechanism in combination, a driving member, a pawl-carrier operated by the driving member and having pawl-sockets each extending therethrough, a plural number of independently-movable driven clutch members located on opposite sides of the carrier with ratchet-recesses formed therein with shoulders facing in different directions of rotation, a wheel-hub secured to one of said clutch members, a brake mechanism connected to the opposite clutch member, and free-moving self-operating pawls borne in the pawl-sockets in the carrier and adapted to engage the ratchet-recesses in the respective driven clutch members.

6. In a driving and brake mechanism in combination, a driving member, a pawl-carrier operated by the driving member and having pawl-sockets extending therethrough and inclined in the direction of rotation of the carrier, a driven clutch member located on one side of and mounted concentric to the carrier and having shouldered recesses, a wheel-hub secured to said driven clutch member, a driven clutch member located on the opposite side of the carrier and mounted concentric thereto and having a shouldered recess, brake mechanism connected to the last-mentioned driven clutch member and free-moving pawls located in the sockets in the carrier, each pawl being adapted to engage a shouldered recess in each of the driven clutch members.

7. In a driving and brake mechanism in combination, a driving member, a pawl-carrier operated by the driving member and having pawl-sockets each extending therethrough, a driven clutch member located outside of and mounted concentric to the carrier and having a shouldered recess, a driven clutch member located inside of the carrier opposite to the other clutch member and having a shouldered recess, a wheel-hub secured to said inner driven clutch member, brake mechanism connected with the driven clutch member located outside of the carrier, and free-moving pawls located in the sockets in the carrier, each pawl being adapted to engage a shouldered recess in each of the driven clutch members.

8. In combination, a driving member with means for operating it, a pawl-carrier operated by the driving member and having a pawl-socket extending therethrough and forming one member of a clutch device, driven members located on opposite sides of the carrier and each having a recess with a shoulder facing the wall of the pawl-socket and each of said driven members forming another member of the clutch mechanism, and a free-moving gravity-operated pawl located in the pawl-socket and adapted to be located between the wall of the socket and the shoulder in each of the recesses in the driven members and forming the connections between the clutch members.

9. In combination, a wheel-hub, a ring-shaped clutch member having recesses and means for securing it to said hub, a sprocket-wheel having a carrier secured thereto and mounted on said clutch member, the carrier having pawl-sockets each extending therethrough and adapted to register with the ratchet-recesses in the ring-shaped clutch member, a cup-shaped brake-clutch member fitting upon the outside of the carrier and having a ratchet-recess adapted to register with the pawl-sockets in the carrier, free-moving pawls located in the sockets in the carrier, each pawl being adapted to engage a ratchet-recess in the ring-shaped and cup-shaped clutch members respectively, and a tire-brake mechanism connected to the brake-clutch member.

10. In a driving and brake mechanism, in combination, a driving member, a pawl-carrier secured to the driving member and having pawl-sockets each extending therethrough, a plural number of independently-driven clutch members located concentrically on opposite sides of the carrier and each having a shouldered ratchet-recess formed therein, one or more pawls located in the pawl-sockets in the carrier and adapted to engage each of the shouldered ratchet-recesses in the oppositely-movable driven clutch members, and a brake operatively connected to one of said clutch members.

JAMES S. COPELAND.

Witnesses:
CHAS. L. BURDETT,
FELTON PARKER.